United States Patent

Easter

[11] Patent Number: 6,132,154
[45] Date of Patent: Oct. 17, 2000

[54] INSTRUMENT PANEL RETENTION FIXING DEVICE

[76] Inventor: Robert Leslie Easter, 10 Summerwood Close, Hadleigh Essex SS7 1QD, United Kingdom

[21] Appl. No.: 09/364,237

[22] Filed: Jul. 29, 1999

[30] Foreign Application Priority Data

Jul. 30, 1998 [GB] United Kingdom ............... 9816478

[51] Int. Cl.[7] ............................ F16B 19/00; F16B 21/00; B62D 25/14
[52] U.S. Cl. ..................... 411/508; 411/339; 411/908; 411/913; 24/297; 296/72
[58] Field of Search ................... 411/338, 339, 411/508, 509, 512, 908, 913; 24/297, 453; 296/72

[56] References Cited

U.S. PATENT DOCUMENTS

| 5,437,516 | 8/1995 | Sauerwein et al. | 411/508 X |
| 5,469,606 | 11/1995 | Hansen | 411/508 X |
| 5,542,158 | 8/1996 | Gronau et al. | 24/297 X |
| 5,580,204 | 12/1996 | Hultman | 411/339 X |
| 5,662,375 | 9/1997 | Adams et al. | 24/297 X |

Primary Examiner—Neill Wilson

[57] ABSTRACT

A fastening device 1 for securing an instrument panel 3 to a vehicle body 5 comprising a first striker member 7 for passing through a bore 9 in the instrument panel 3, the first striker member 7 comprising an enlarged head 11, and a nose 13, extending from the head 11 and coupled to the head 11 by a shank 15 having a transverse cross section which is smaller than the transverse cross section of the head 11, the nose 13 having a transverse cross section 17 greater than the transverse cross section of the shank 15 such that a shoulder area 19 is defined, the nose 13 tapering from a region 17 to the nose tip 21, and a second catch member 23 on the vehicle body 5 having a nose receiving housing 27 shaped to receive the nose 13 with a mouth 29 into which the nose 13 may be pushed and a throat region having resilient walls to grip the nose 13 when inserted in the housing 25, the throat 33 and cavity 31 defining a shoulder region 35 which inhibits the removal of the nose 13 from the cavity 31 by the shoulder 19 of the nose 13 bearing against the shoulder 35 of the cavity 33.

3 Claims, 5 Drawing Sheets

INSTRUMENT PANEL RETENTION FIXING DEVICE

TECHNICAL FIELD

The present invention relates to an improved fastening device for securing an instrument panel to a vehicle body.

DISCUSSION OF THE PRIOR ART

An instrument panel within a vehicle has to be retained securely in position in order to ensure no rattles when in motion. However the assembly of the instrument panel has to be quick and easy, and it is preferred that disassembly is also easy. Because the body (usually the cowl top) is of sheet metal and the instrument panel is of plastics material difficulties may arise due to thermal expansion and contraction. Previous fixings employed screws with high clamping forces and did not permit a sideways movement required for expansion.

SUMMARY OF THE INVENTION

According to the invention there is provided a fastening device for securing an instrument panel to a vehicle body comprising a first striker member for passing through a bore in the instrument panel, the first striker member comprising an enlarged head, and a nose, extending from the head in a first direction and coupled to the head by a shank having a transverse cross section taken along a first plane substantially perpendicular to the first direction which is smaller than the transverse cross section of the head, the nose having a transverse cross section for at least part of its depth greater than the transverse cross section of the shank such that a shoulder area is defined, the nose tapering from a region of large transverse cross sectional area away from the shank to the nose tip, the longitudinal cross section of the nose being substantially constant in a lateral direction orthogonal to the first direction, and a second catch member for mounting on the vehicle body, including mounting means and a nose receiving housing shaped to receive the nose and having a longitudinal cross section which is substantially constant in a lateral direction, the nose receiving housing having a mouth into which the nose may be pushed, a cavity of depth greater than the depth of the nose taken from the nose tip to the shank and whose transverse cross section is at least for some of its depth greater than the greatest transverse cross section of the nose, and a throat region of smaller transverse cross section, at least the throat region of the nose receiving housing having resilient walls to grip the nose when inserted in the housing, the throat and cavity defining a shoulder region which inhibits the removal of the nose from the cavity by the shoulder of the nose bearing against the shoulder of the cavity.

In use the catch member is mounted upon the vehicle body and the nose of the striker member is passed through a bore in the instrument panel and then through the mouth of the nose receiving housing until the nose lies within the cavity. The taper of the nose from the tip allows the resilient walls of the throat to be pushed open to allow the region of greater cross section to be passed through. Once the region of greater cross section has passed through the throat, the shank of the striker of smaller cross section allows the resilient walls of the housing to snap back to retain the nose within the cavity. The instrument panel is then retained between the catch member and the enlarged head of the striker member.

Once in position the instrument panel is retained securely, but lateral movement is allowed since the nose can slide in a lateral direction within the housing, due to the constant longitudinal cross section in one direction. The snap fixture allows for easy assembly, particularly with steeper rake windscreens.

The nose may taper from the area of greatest transverse cross section towards the shank, but the taper angle must be significantly greater than the angle of taper in the opposite direction towards the nose tip. The force required to pull the nose out of the cavity has to be much greater than the force required to push the nose into the cavity.

The striker member may comprise two parts, with the enlarged head being removable from the shank. Thus for disassembly, the head is removed allowing the instrument panel to be lifted from the shank. More preferably the head is screw threadedly engaged with the shank so that the head may be screwed off the shank when the instrument panel needs to be removed (and can be screwed back in again when replaced).

The throat only of the cavity receiving housing may have resilient walls or the whole cavity may have resilient walls. The walls may be resilient because of the material from which the member is made, or alternatively they may be urged inwards by an auxiliary clip member surrounding the outside of the cavity and throat.

Preferably the mounting means of the catch member includes a flange extending laterally from the nose receiving housing, the flange arranged to secure sound dampening material between it and the vehicle body, so that the catch member is dual purpose.

Although the cavity may have a rectangular longitudinal cross section having a throat of smaller cross section, preferably the cavity has a complementary shape to the nose to hold the nose most securely.

BRIEF DESCRIPTION OF THE DRAWING

A fastening device for securing an instrument panel to a vehicle body will now be described, by way of example only with reference to the accompanying drawings, in which.

DETAILED DESCRIPTION OF THE BEST MODE

Figure 1:
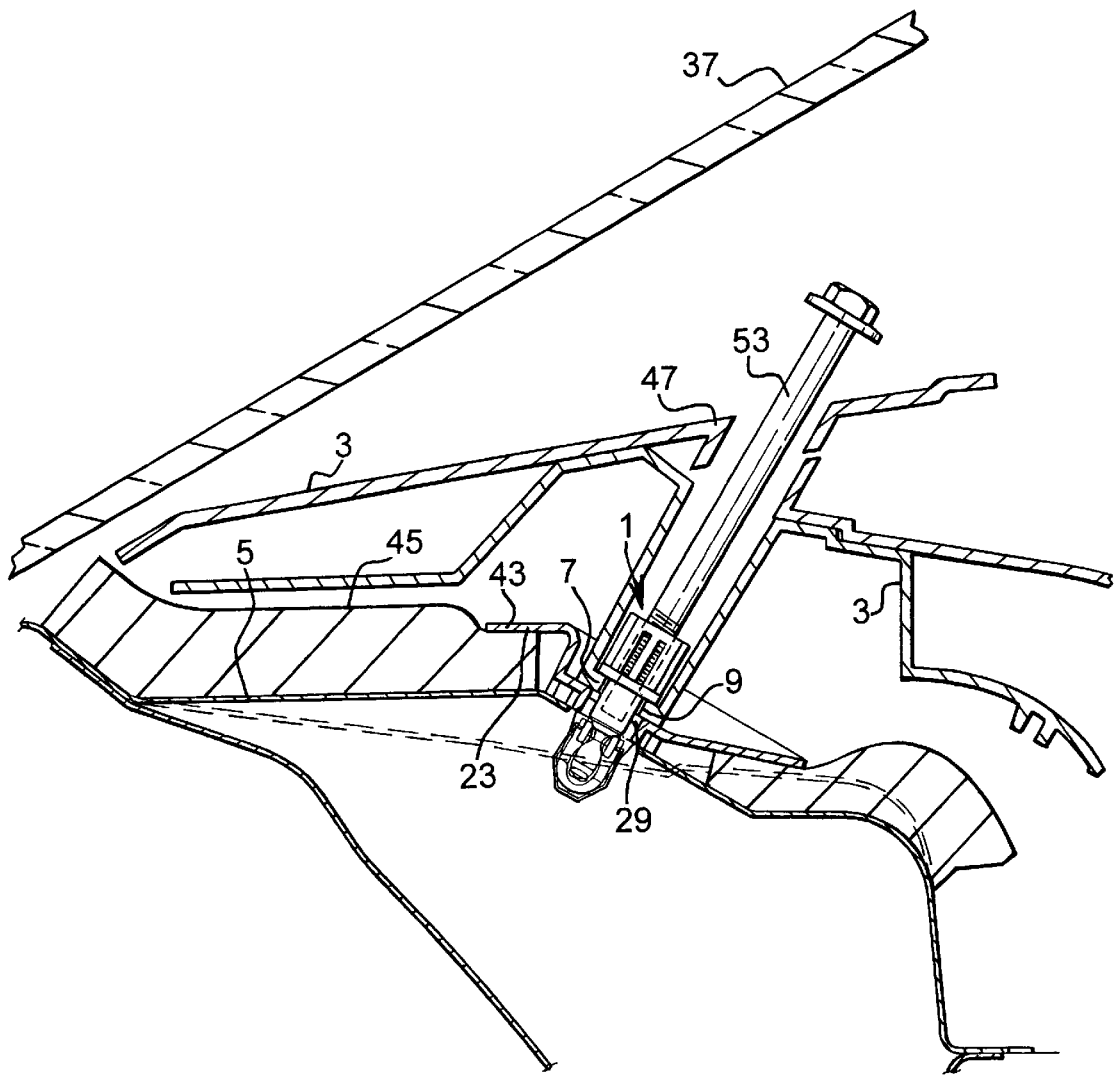
FIG. 1 is a longitudinal cross section through a fastening device in position retaining an instrument panel to a vehicle body.
Figure 2:
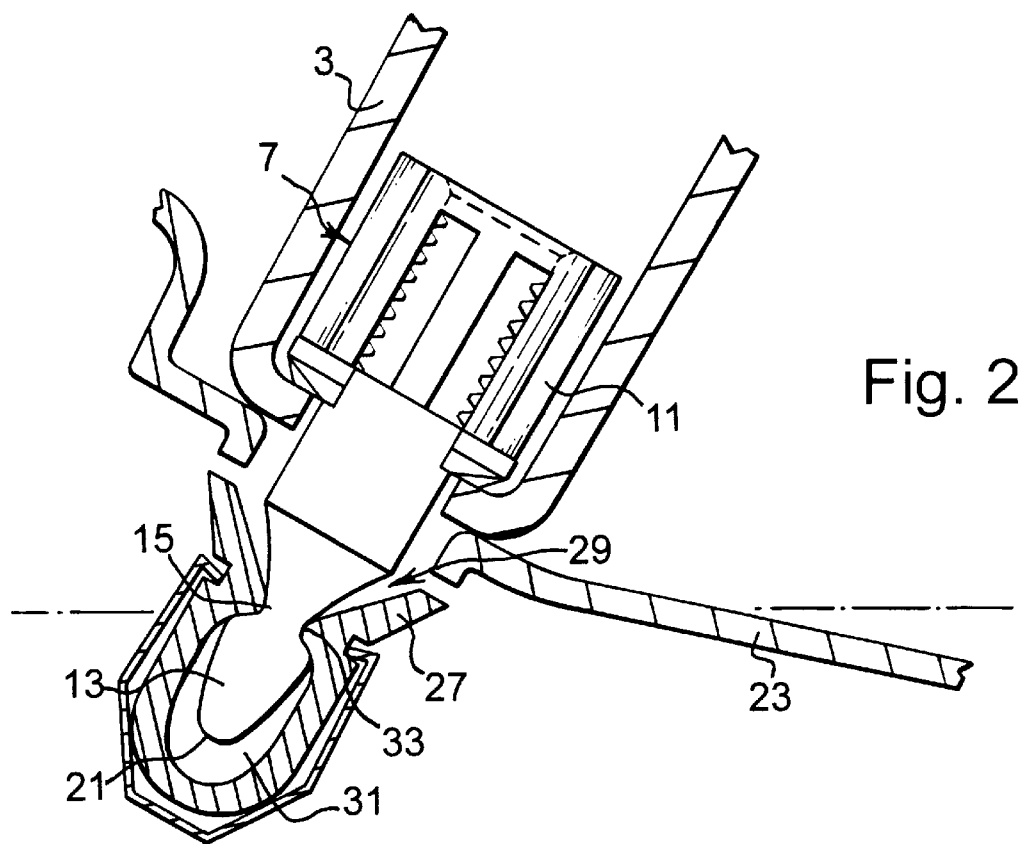
FIG. 2 is a enlarged detailed view of part of FIG. 1 showing the device in more detail.
Figure 3:
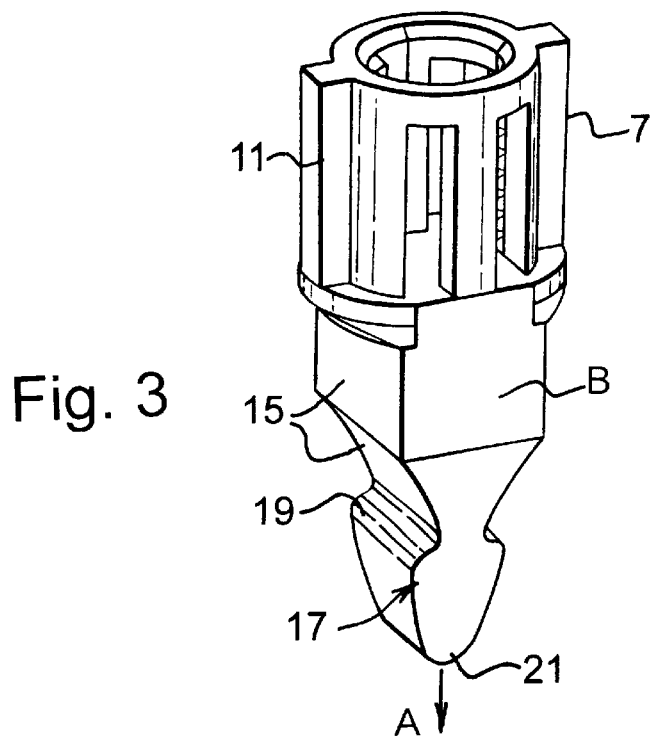
FIG. 3 is a perspective view of the striker member.
Figure 4:
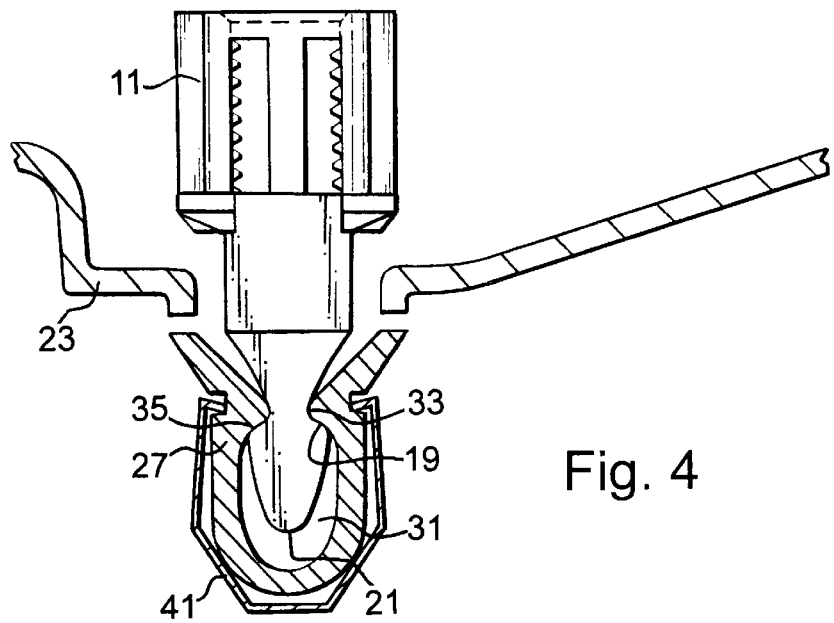
FIG. 4 is a perspective view of the catch member with the striker member within.
Figure 5:
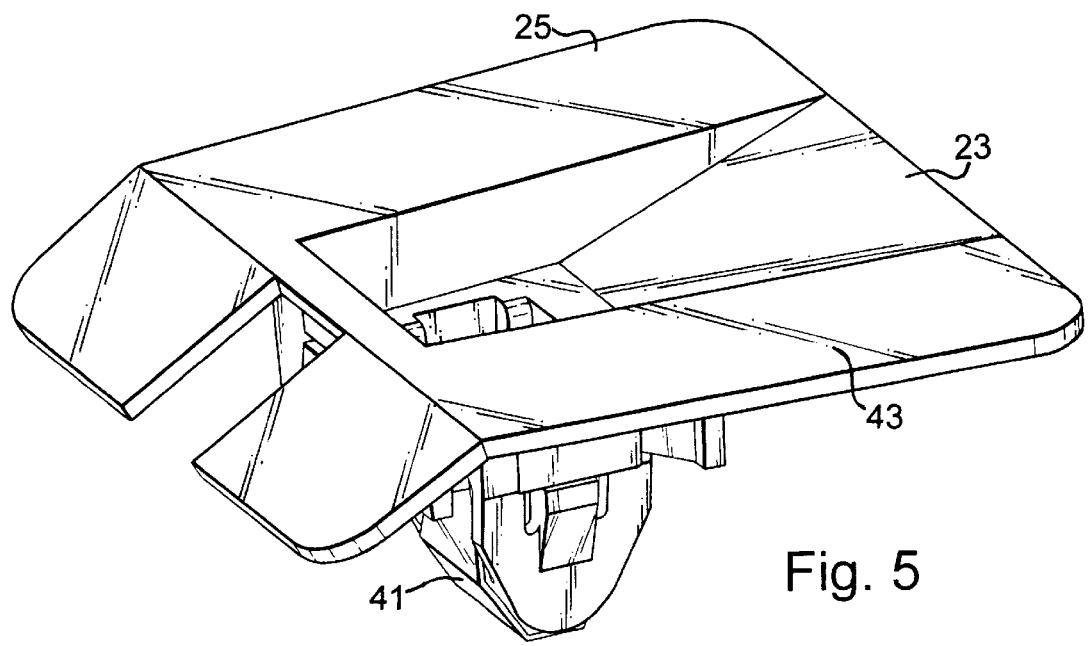
FIG. 5 is a longitudinal cross section through the catch member of FIG. 4.
Figure 6:
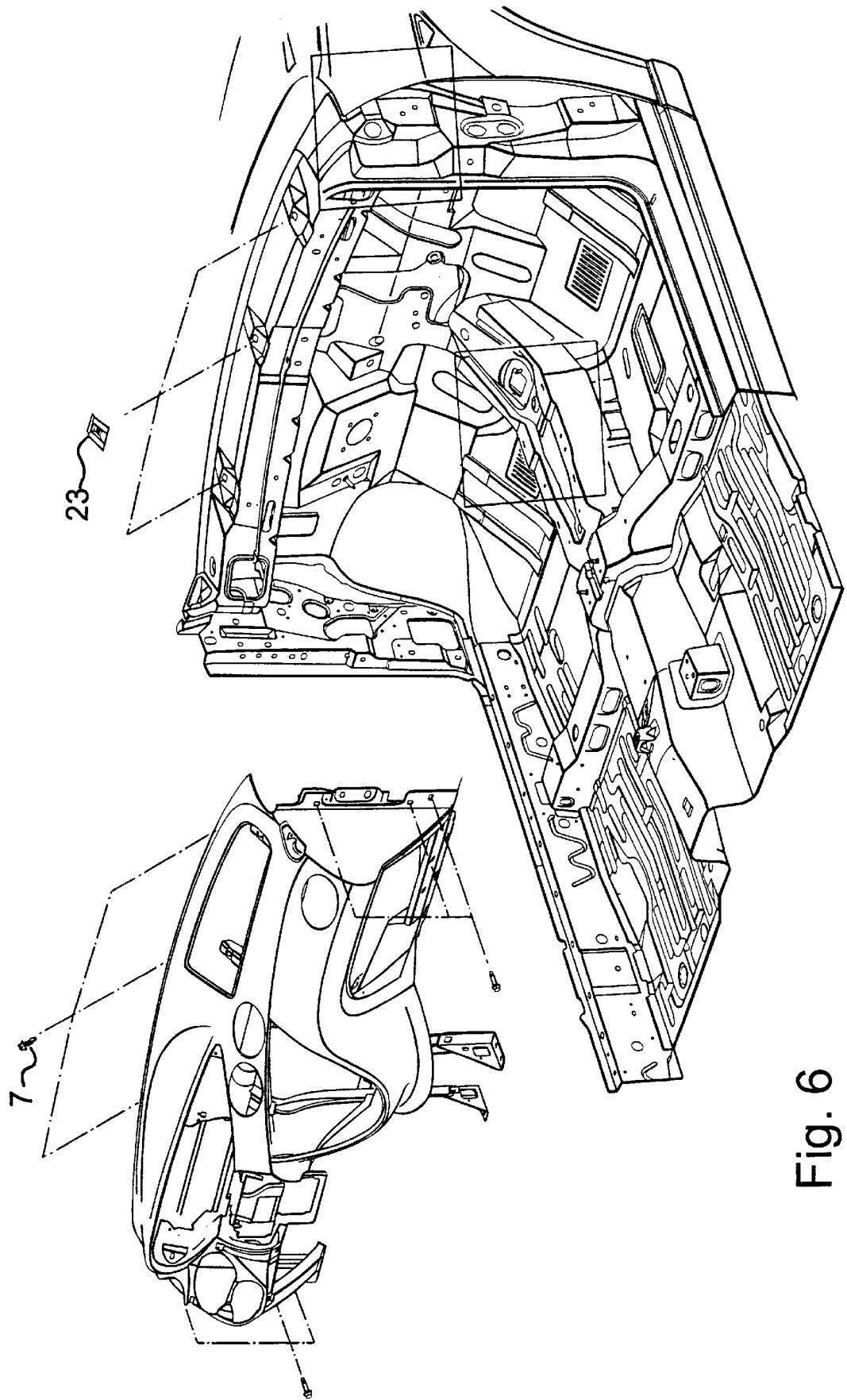
FIG. 6 is an exploded view of part of a vehicle illustrating assembly of the instrument panel; and, FIG. 7 is a schematic view illustrating disassembly of the instrument panel.
Figure 7:
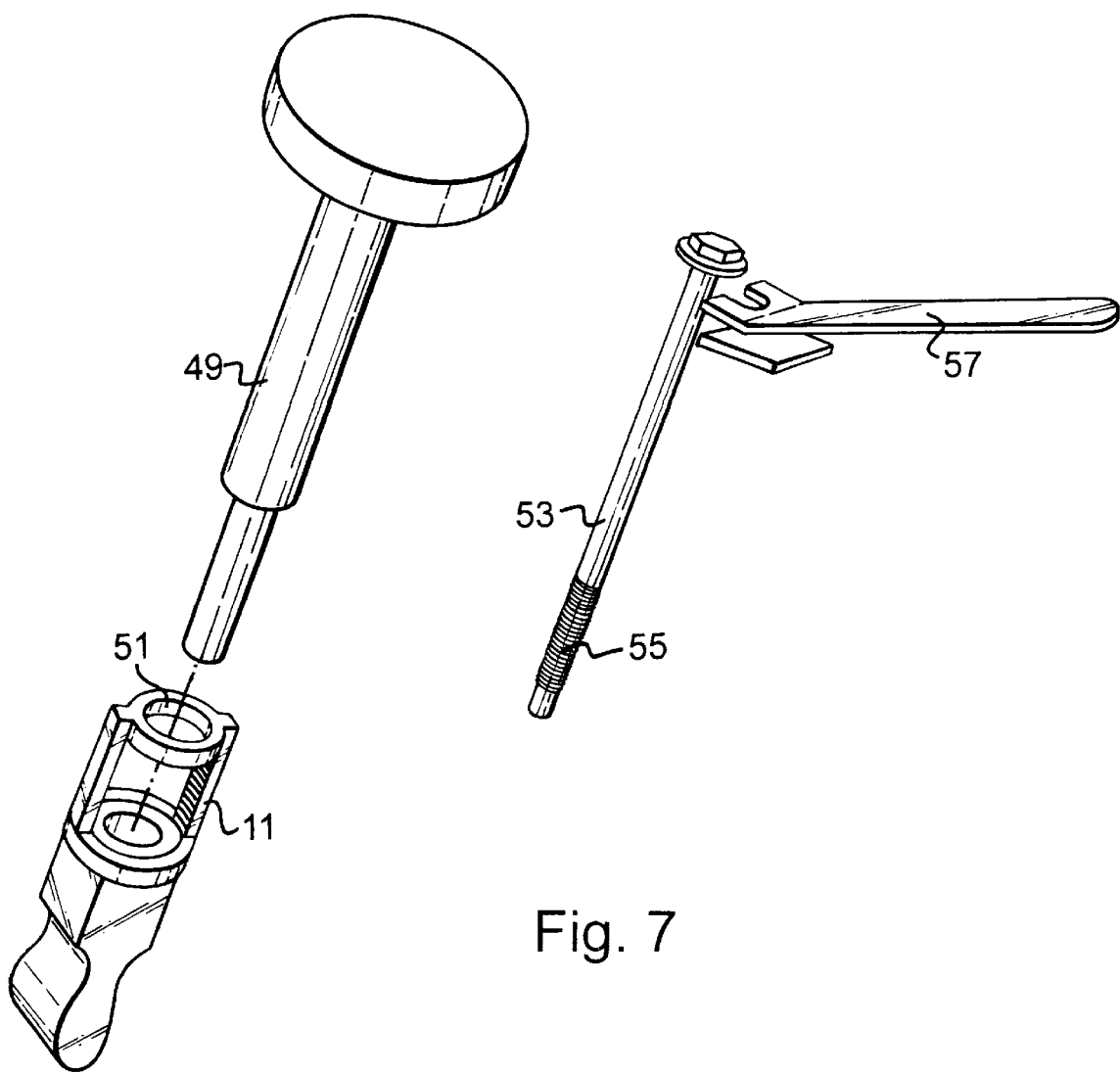

A fastening device 1 for securing an instrument panel 3 to a vehicle body 5 comprising a first striker member 7 for passing through a bore 9 in the instrument panel 3, the first striker member 7 comprising an enlarged head 11, and a nose 13, extending from the head 11 in a first direction A and coupled to the head 11 by a shank 15 having a transverse cross section taken along a first plane B substantially perpendicular to the first direction A which is smaller than the transverse cross section of the head 11, the nose 13 having a transverse cross section 17 for at least part of its depth greater than the transverse cross section of the shank 15 such that a shoulder area 19 is defined, the nose 13 tapering from a region 17 of large transverse cross sectional area away from the shank to the nose tip 21, the longitudinal cross section C of the nose being substantially constant in a lateral direction orthogonal to the first direction (longitudinal cross section taken in a plane parallel to the plane of the paper in FIG. 1), and a second catch member 23 for mounting on the vehicle body 5, including mounting means 25 and a nose receiving housing 27 shaped to receive the nose 13 and having a longitudinal cross section which is substantially constant in a lateral direction, the nose receiving housing 25 having a mouth 29 into which the nose 13 may be pushed, a cavity 31 of depth greater than the depth of the nose 13 taken from the nose tip 21 to the shank 15 and whose transverse cross section is at least for some of its depth greater than the greatest transverse cross section 17 of the nose, and a throat region 33 of smaller transverse cross section, at least the throat region 33 of the nose receiving housing having resilient walls to grip the nose 13 when inserted in the housing 25, the throat 33 and cavity 31 defining a shoulder region 35 which inhibits the removal of the nose 13 from the cavity 31 by the shoulder 19 of the nose 13 bearing against the shoulder 35 of the cavity 33.

As can be seen in FIG. 1 in use the catch member 23 is mounted on the vehicle body 5, here the cowl top. The mounting means 25 is mounted upon the vehicle body by bolts passing through bores in the plate 25 but such means is not illustrated in the drawing.

The nose 13 of the striker body 7 is passed through bore 9 in the instrument panel 3 and then through the mouth 29 of the nose receiving housing 27 until the nose 13 lies within the cavity 31. The taper of the nose 13 from the tip 21 allows the resilient walls of the throat 33 to be pushed open to allow the region of greater cross section 17 to be passed through. Once that region 17 has passed through the throat 33, the shank 15 of the striker of smaller cross section allows the resilient walls of the housing 25 to snap back to retain the nose 13 within the cavity 31. The instrument panel 3 is then retained between the catch member 23 and the enlarged head 11 of the striker member 7.

Once in position the instrument panel 3 is retained securely, but lateral movement is allowed since the nose 13 can slide in a lateral direction within the housing 25 due to the constant longitudinal cross section in one direction. The snap fixture allows for easy assembly, particularly with steeper rake windscreens 37 as illustrated in FIG. 1.

The nose 13 does taper slightly from the area of greater cross section 17 towards the shank 15 but the taper angle is significantly greater than the angle of taper in the opposite direction towards the nose tip 21. The force required to pull the nose 13 out of the cavity 33 is much greater than the force to push it in. In this case the force for insertion is a maximum of 80N with a pull out force of a minimum of 300N.

The striker member is typically made of a polyamide. For disassembly the head 11 is removed allowing the instrument panel 3 to be lifted from the shank 15.

The walls of the throat 33 of the housing are surrounded by an auxiliary spring clip member 41 which gives the walls resilience and urges them inwards.

The mounting means 25 of the catch member 23 includes a flange 43 which extends laterally from the nose receiving housing 27 so that in use it secures sound dampening material 45 between it and the vehicle body 5. The catch member 23 is thus dual purpose. The catch member is typically a glass filled polyamide.

The instrument panel 3 is fastened in place on the cowl by three fastening devices as described. The instrument panel includes 3 recessed location niches 47 for ready location of the striker members 7. These are elongate and angled roughly parallel to the rake of the windscreen for easier access.

The striker member is place in position by holding it upon an elongate mounting member 49 which is pushed into cavity 51 in the enlarged head 11 so that the operator has control to manoeuvre it into position within location niche 47.

Removal of the head is effected by the use of an elongate long bolt 53 with screw threaded end 55 which engages within internally screw threaded head 11. The long bolt 53 is screwed into the head 11 and then pulled to pull head 11 using a lever 57 from the catch member 23 to allow removal of the instrument panel. This is illustrated in FIG. 1.

What is claimed is:

1. A fastening device for securing an instrument panel to a vehicle body comprising a first striker member for passing through a bore in the instrument panel, the first striker member comprising two parts, an enlarged head, and a nose, extending from the head in a first direction and coupled to the head by a shank, the enlarged head being removable from the shank, said shank having a transverse cross section taken along a first plane substantially perpendicular to the first direction which is smaller than the transverse cross section of the head, the nose having a transverse cross section for at least part of its depth greater than the transverse cross section of the shank such that a shoulder area is defined, the nose tapering from a region of large transverse cross sectional area away from the shank to the nose tip, the longitudinal cross section of the nose being substantially constant in a lateral direction orthogonal to the first direction, and a second catch member for mounting on the vehicle body, including mounting means and a nose receiving housing shaped to receive the nose and having a longitudinal cross section which is substantially constant in a lateral direction, the nose receiving housing having a mouth into which the nose may be pushed, a cavity of depth greater than the depth of the nose taken from the nose tip to the shank and whose transverse cross section is at least for some of its depth greater than the greatest transverse cross section of the nose, and a throat region of smaller transverse cross section, at least the throat region of the nose receiving housing having resilient walls to grip the nose when inserted in the housing, the throat and cavity defining a shoulder region which inhibits the removal of the nose from the cavity by the shoulder of the nose bearing against the shoulder of the cavity.

2. A fastening device according to claims 1, in which the enlarged head is screw threadedly engaged with the shank.

3. A fastening device according to claim 2, in which the catch member includes a spring clip surrounding the nose receiving housing to provide resilient walls.

* * * * *